United States Patent

Simeth et al.

[15] 3,645,133
[45] Feb. 29, 1972

[54] ELECTRONIC SPIROMETER

[72] Inventors: Peter G. Simeth; Richard C. Seeley, both of Santa Barbara, Calif.

[73] Assignee: Metrophysics, Inc.

[22] Filed: Apr. 15, 1970

[21] Appl. No.: 28,862

[52] U.S. Cl. ................................................73/204
[51] Int. Cl. ..............................G01f 1/00, G01p 5/10
[58] Field of Search ...................................73/204

[56] References Cited

UNITED STATES PATENTS

| | | | |
|---|---|---|---|
| 2,892,347 | 6/1959 | Laprand | 73/204 |
| 3,433,069 | 3/1969 | Trageser | 73/204 |
| 2,726,546 | 12/1955 | King, Jr. | 73/204 |
| 3,085,431 | 4/1963 | Yerman et al. | 73/204 |
| 3,438,254 | 4/1969 | Seeley | 73/204 |

*Primary Examiner*—Charles A. Ruehl
*Assistant Examiner*—Herbert Goldstein
*Attorney*—Eckhoff and Hoppe

[57] ABSTRACT

An electronic spirometer having an accurate indication of exhaled tidal or minute volume. In the preferred embodiment, an adapter fits on the exhalation port of the breathing circle and monitors a patient's exhaled volume when being ventilated. A heated thermistor mounted in the adapter senses the gas flow as an approximate fourth power function of the current necessary to maintain the thermistor at a constant temperature. A signal conditioner provides the current required to keep the thermistor at a constant temperature and converts the nonlinear heater current into a signal which is proportional to flow. A second thermistor in the probe corrects for temperature variations. The output of the signal conditioner is fed into the integrator circuit which converts the flow signal to a volume signal. In the minute volume mode, a clock generates a command signal every 30 seconds. This transfers the integrator output into a readout unit and resets the integrator to zero. In the tidal volume mode, the flow is integrated on a breath by breath basis and the volume signal is read out when the exhaled flow reaches zero. Outputs are provided for recording the flow rate and the minute integrated volume. An alarm system is provided for indicating when minute volume limits are too low or too high.

2 Claims, 9 Drawing Figures

INVENTORS
PETER G. SIMETH
BY RICHARD C. SEELEY
Eckhoff and Hoppe
ATTORNEYS

INVENTORS
PETER G. SIMETH
RICHARD C. SEELEY
BY Eckhoff and Hoppe
ATTORNEYS

ELECTRONIC SPIROMETER

The best mode contemplated by the applicants for carrying out their invention is illustrated in the accompanying drawings in which FIG. 1 is a general block diagram showing the entire system;

GENERAL DESCRIPTION

Figure 1:
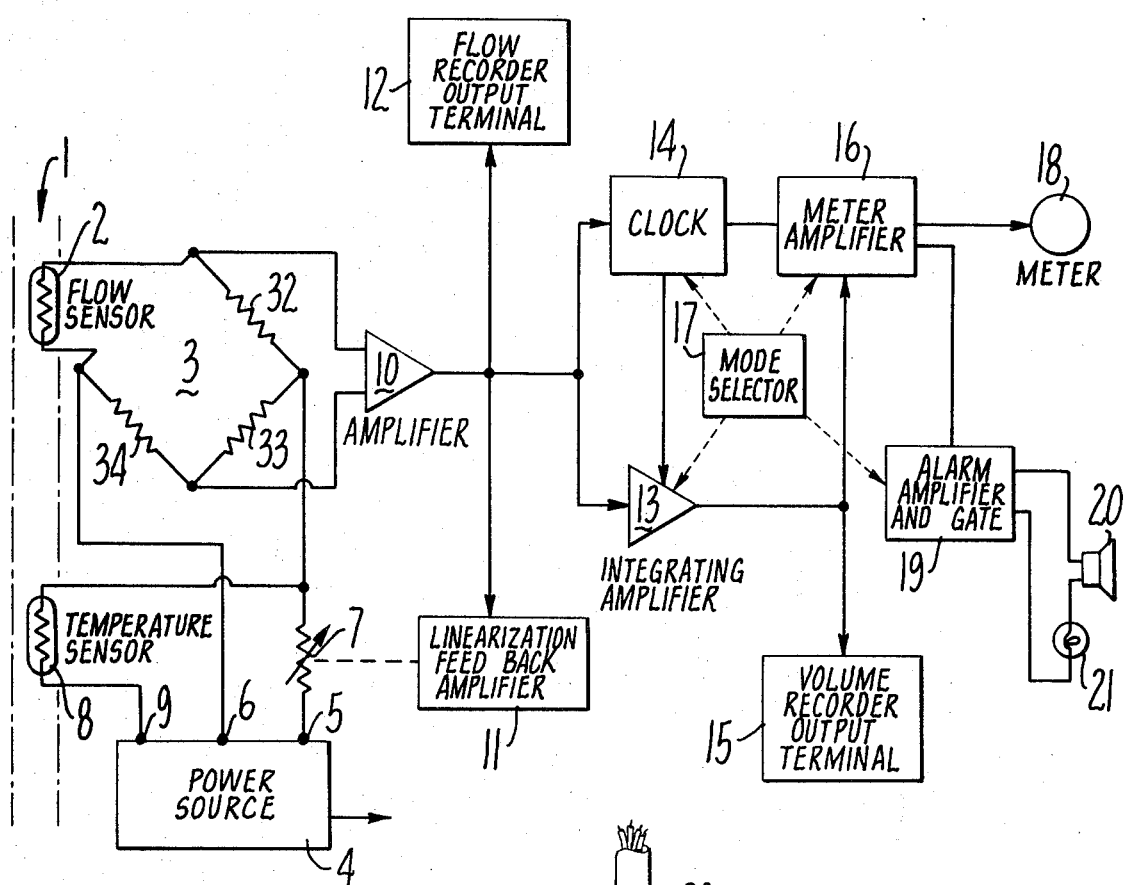
Figure 2:
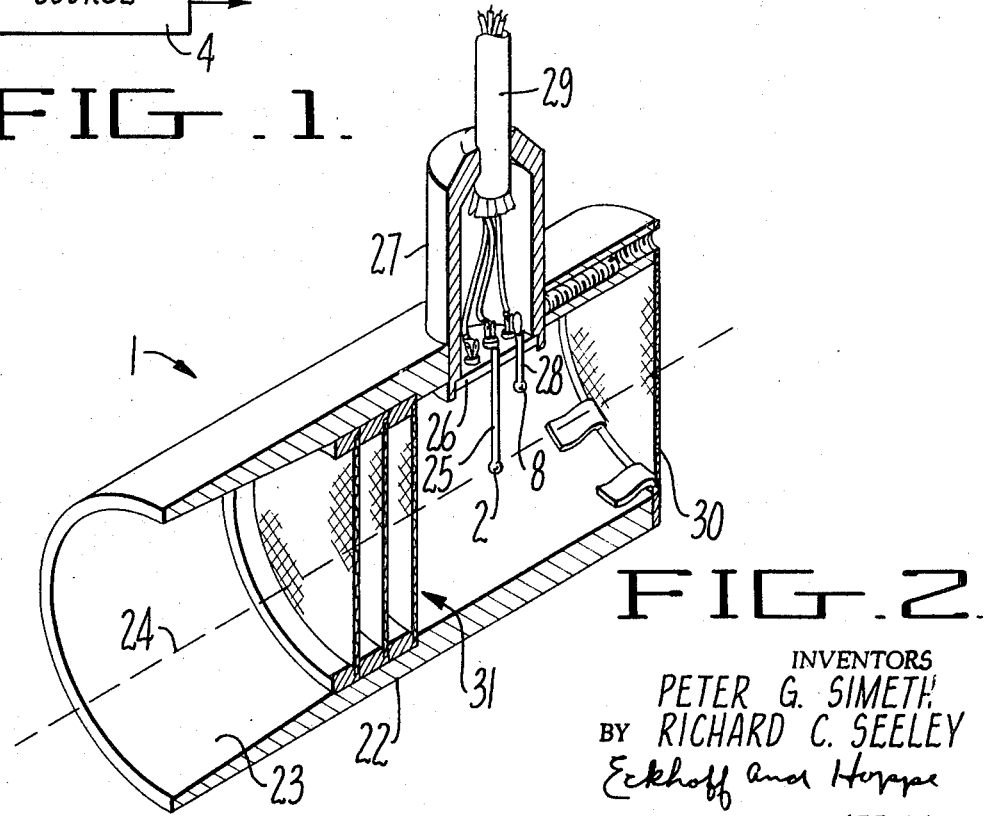
FIG. 2 is a perspective view, shown in longitudinal section, of the sensing probe used in the system of FIG. 1.

Referring to the drawings, FIGS. 1 and 2, a sensing probe 1 is by way of example provided for application on the exhalation port of the breathing circle of a mechanical ventilator which is applied to a patient.

A flow sensor thermistor 2 mounted within the probe 1 and exposed to the flow stream of the air being exhausted from the patient makes up one leg of a sensing bridge 3. Operating potential for the bridge 3 is supplied from a power source 4 which provides from its terminals 5, 6 a source of direct current of constant regulated voltage. Variable resistor means 7 are provided in one of the lines from the bridge 3 to the power source 4. A temperature sensor 8, also mounted within the probe 1 and located in the flow stream of the air exhaled from the patient, is connected to a source of direct current of constant regulated current provided by terminals 5, 9 of the power source 4 through circuitry which also includes variable resistor means 7. In a manner to be described later, the variable resistor means 7 regulates the power supplied to the bridge 3 so that the bridge 3 is balanced when there is no air flowing through the sensing probe past the flow sensor 2. Air flowing past the thermistor 2 reduces the temperature of that thermistor thereby increasing its resistance and unbalancing the bridge. The amount to which the bridge is unbalanced is measured by a differential amplifier 10. The output signal from flow amplifier 10 is fed to a linearization feedback amplifier 11 which controls the effective resistance of resistor means 7. In a manner later to be described in this specification, the linearization feedback amplifier 11, the temperature sensor 8, and the variable resistor means 7 cooperate to correct the system for temperature variations of the air within the probe 1 and to linearize the voltage output of the low amplifier 10 to provide a signal which is linearly proportional to flow. The output signal from flow amplifier 10 is also applied to a flow recorder output terminal 12, to an integrating amplifier 13 and to an electronic clock 14. The output of the integrating amplifier 13 is applied to a volume recorder output terminal 15 and to a meter amplifier 16. Mode selector means 17 associated with the integrating amplifier 13, clock 14 and the meter amplifier 16 are provided to condition the system so that in one condition a meter 18 connected to the output of amplifier 16 will indicate the flow on a tidal, or breath to breath, basis and in another condition will indicate the volume per minute of the patient's exhaled air. Finally, another output of meter amplifier 16 is fed to an alarm amplifier and gate 19 which supplies a signal to horn 20 and lamp 21 whenever the mode selector is set for the minute volume mode and the proper minute volume limits either are not being attained or are being exceeded.

With this general description of the system as a whole, attention is now given to the various components making up the system.

THE SENSING PROBE

The sensing probe 1 of the system, best shown in FIG. 2, is provided with an open ended cylindrical housing 22, the interior wall 23 of which forms a duct through which the patient's exhaled air is exhausted. The flow sensor thermistor 2 is mounted along the axis 24 of the duct by means of a strut 25. The strut 25 in turn is secured to a terminal board 26 mounted within the interior end of a holder 27 which extends radially outward from the housing 22 of the probe. Temperature sensor 8 is also mounted within the probe 1 but is located radially outward from the axis 24 of the duct upon a strut 28 which, like the strut 25, is also secured to the terminal board 26. A four conductor shielded cable 29 interconnects the sensors 2 and 8 and the balance of the system. Also mounted within the duct defined by the interior wall 23 of the cylindrical housing 22, are a screen 30 to cover the downstream side of the probe and screen-spacer means 31 for providing a laminar flow of air through the probe.

THE TRANSDUCER TO VOLTAGE OUTPUT ELECTRONICS

Figure 3:
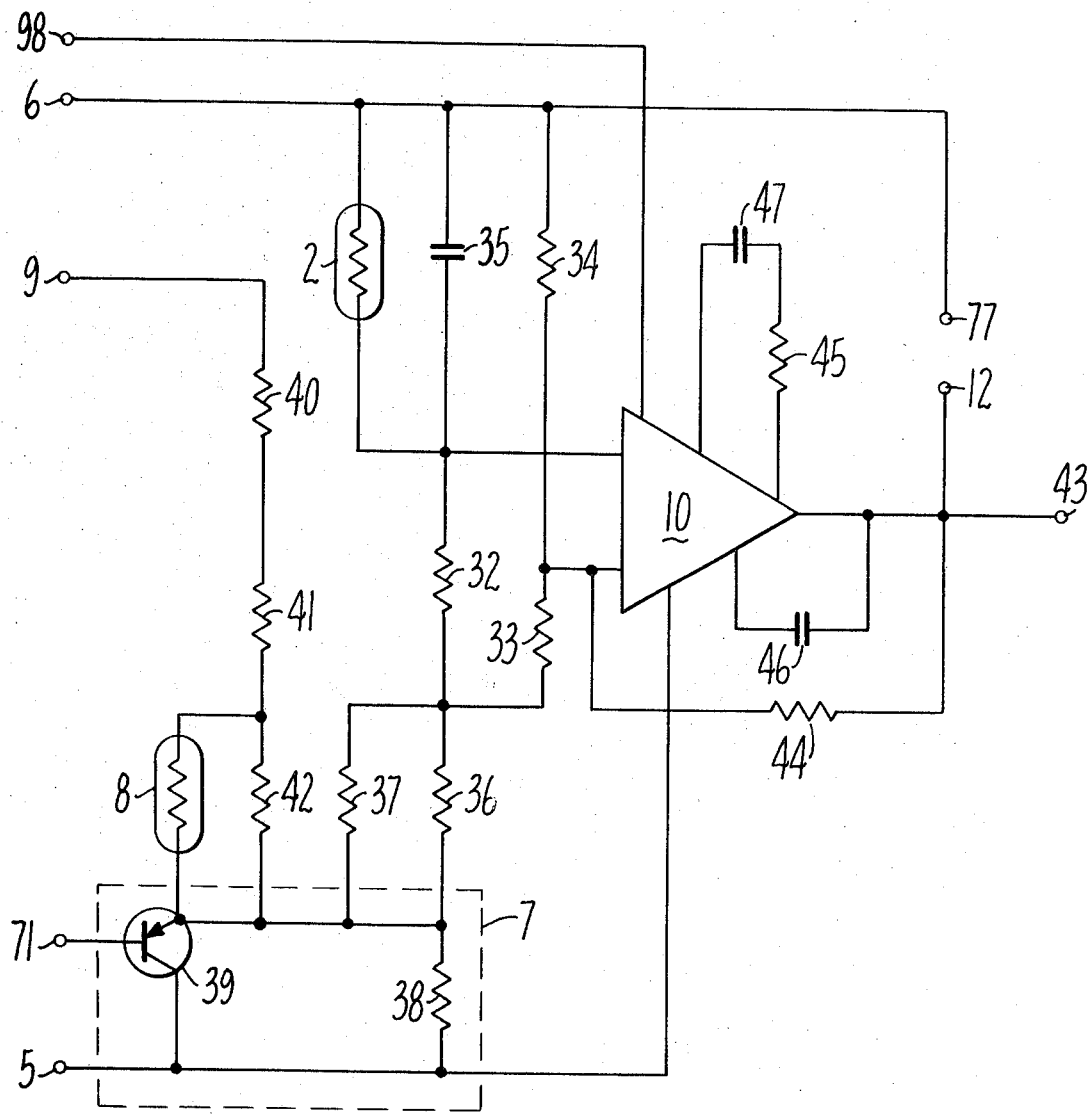
FIG. 3 is a detailed schematic of the flow sensor thermistor, the temperature sensor thermistor, the flow amplifier and the immediately related circuitry shown in FIG. 1.
Figure 4:
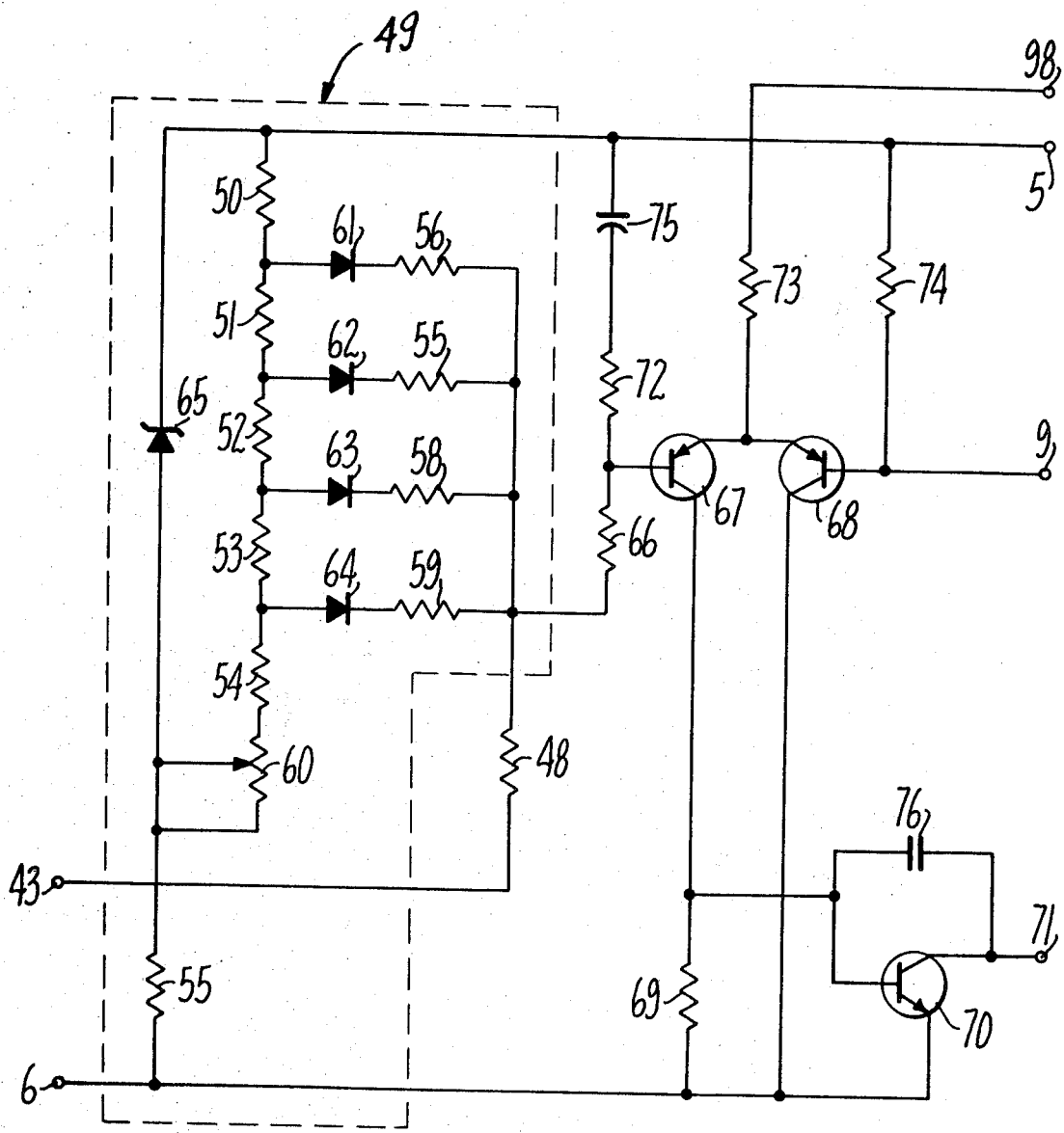
FIG. 4 is a detailed schematic of the linearization feedback amplifier shown in FIG. 1.

The electronics for providing an output voltage which is linearly proportional to the velocity of the air flowing through the sensing probe is illustrated in FIGS. 3 and 4, both of which should be considered in connection with the general schematic of the entire system shown in FIG. 1. As shown above, the flow sensor thermistor 2 makes up one leg of the sensing bridge 3. Other legs of the bridge 3 are made up of resistors 32, 33 and 34. A capacitor 35 in parallel with the thermistor 2 eliminates high frequency noise signals picked up by the sensing probe and connecting cable. Resistors 36 and 37 interconnecting the bridge 3 with the variable resistor means 7 act as gain adjustment means for the system. In practice, resistor 36 is of a predetermined value dependent upon system design and resistance 37 is selected to adjust the gain of a particular probe. The variable resistor means 7 include a resistor 38 bridging the emitter and collector of a PNP-transistor 39.

The temperature compensating transistor 8 is in a branch circuit consisting of terminal 9 connected to a source of regulated constant direct current, resistors 37 and 41 are located in the electrical connector of each probe. They are selected to adjust the gain and zero of each probe to match a standard probe.

In order to make probes interchangeable between systems, the resistors 37 and 41 are located in the electrical connector of each probe. They are selected to adjust the gain and zero of each probe to match a standard probe.

In operation, the regulated source of constant voltage applied from terminals 5 and 6 to the bridge circuit including the thermistor 2 heats the thermistor thereby decreasing its resistance over its value in the ambient air. The resulting imbalance, or balance, of the bridge is detected by amplifier 10 and converted to a voltage output signal at output terminal 43. Amplifier 10 is an operational amplifier provided with usual functional networks including resistors 44 and 45 and capacitors 46 and 47.

In order to make the system insensible to variations in the temperature of the ambient air, the constant current source across the terminals 5, 9 is used in conjunction with the thermistor 8 and the related resistor networks to apply a temperature to the bias the bridge 3. It will become apparent that as the temperature of the ambient air increases, the resistances of both thermistors 2 and 8 will decrease and that the bias will decrease, thus in turn increasing the output of amplifier 10. In this way the system serves to maintain the temperature of thermistor 2 and its effective resistance at a constant value irrespective of the changes in temperature of the ambient air and the output signal at terminal 43 is a voltage signal which varies only in response to the cooling effects of the air flowing past thermistor 2, thus indicating the velocity of its flow.

Because the output voltage at terminal 43 thus produced varies in response to approximately the fourth root of the velocity of the air flowing across thermistor 2, the system provides means for linearizing the output. Output terminal 43 (see FIG. 4) is supplied through a resistor 48 to a function generating network 49 made up of fixed resistors 50 through 59, both inclusive, variable resistor 60, diodes 61 through 64, both inclusive, and zener diode 65. The resultant output voltage is applied through resistor 66 to the base of PNP-transistor 67. The bias of transistor 67 is controlled by emitter coupled PNP-transistor 68 the base of which is connected to the terminal 9 of the constant current output source and is thus responsive to voltage variations of that source created by variations in the resistance of thermistor 8. An output voltage appearing across resistor 69 at the collector of transistor 68 is applied to the base of NPN-transistor 70. The output voltage appearing at terminal 71 from the collector of that transistor is applied to the base of transistor 39 (see FIG. 3). Resistors 72, 73 and 74 and capacitors 75 and 76 complete the linearization feedback amplifier portion of the circuitry.

The voltage output appearing across terminals 12, 77 (FIG. 3) may be connected to a flow recorder (FIG. 1) to provide a continuous record of the instantaneous rate of flow of exhaled air.

THE INTEGRATING AMPLIFIER

The system includes an integrating amplifier 13 which operates in conjunction with an electronic clock 14 and mode selector 17 to integrate the rate of flow on a breath by breath basis or on a time basis. Flow amplifier output terminal 43 (FIGS. 1, 3 and 5) is applied to the base of one of the transistors of an NPN-type differential amplifier 78 through a network comprising fixed resistors 79, 80 and 81 and potentiometer 82. Switch portion 17a of mode selector 17 is provided to short resistor 80 when the mode selector is adjusted for the tidal volume mode of operation. The base of the other transistor of differential amplifier 78 is returned through resistor 83. The output of differential amplifier 78 is fed to operational amplifier 84 with its associated networks comprising resistor 85 and capacitors 86, 87. Capacitor 88 interconnecting the output of operational amplifier 84 to the input network 79, 80, 81 and 82 serves to integrate the voltage output appearing at terminal 43 on a tidal volume or minute volume basis. The integrating capacitor 88 is discharged by field effect transistor 89 which is triggered from the clock 14 through line 90, coupling capacitor 91 and diode 92. Resistors 93 and 94 complete the circuit. The output from integrating amplifier 13 is supplied to volume recorder terminals 15, 95 and to output terminal 96.

THE CLOCK

Figure 6:
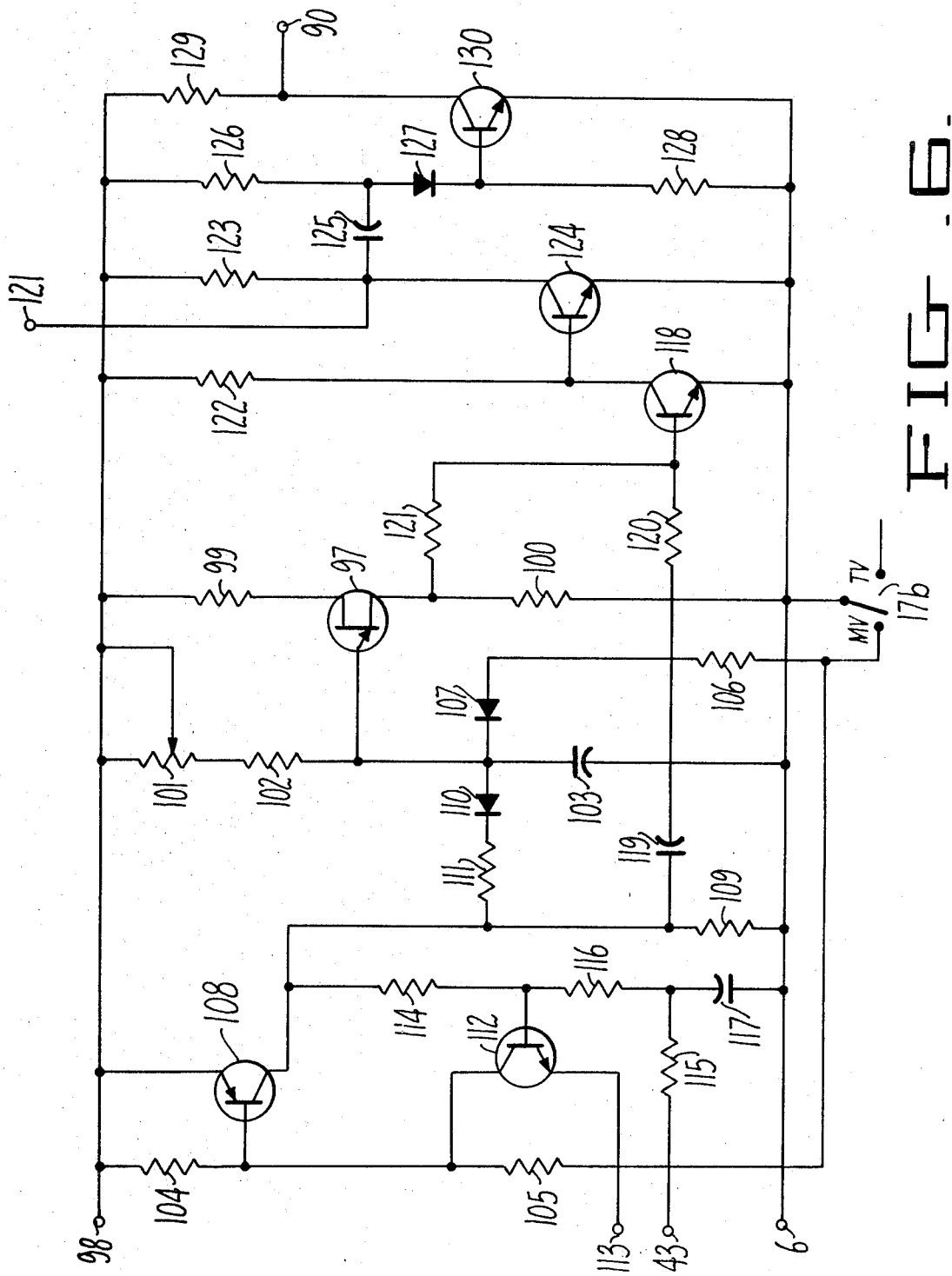
FIG. 6 is a detailed schematic of the clock shown in FIG. 1.

The electronic clock 14 for establishing the time base for minute volume integration is shown in detail in FIG. 6. Bases 2 and 1 of unijunction transistor 97 are connected to a regulated source of constant voltage appearing at terminations 98 and 6 of the power supply through resistor 99 and resistor 100. The control voltage applied to the emitter of the unijunction transistor 97 is supplied from terminal 98 through the resistors 101 and 102.

When mode position switch 17b is in the minute volume position "MV" the "off" time period of unijunction transistor 97 is determined by resistors 101 and 102 and capacitor 103 only. On the other hand when mode switch 17b is switched to the other or tidal volume position "TV," a circuit parallel to that of resistors 101 and 102 is established from terminal 98 through resistors 104, 105 and 106 and diode 107. The "off" time period of unijunction transistor 97 is now determined by capacitor 103 and resistors 101 and 102 in parallel with resistors 104, 105 and 106.

The unijunction transistor 97 only fires in the tidal volume mode if no flow signal occurs in the output terminal 43 from amplifier 10 for the length of time which it takes to charge capacitor 103.

In the absence of a signal at terminal 43 a circuit is established from terminal 98 through PNP-transistor 108 and resistor 109 to terminal 6. The positive voltage appearing at the junction of resistor 109 and the collector of transistor 108 prevents the discharge of capacitor 103 through diode 110 and resistor 111. Transistor 108 is maintained in a conducting or "on" condition by a holding circuit including NPN-transistor 112, the emitter of which is connected to a power terminal 113, and resistor 114. However when a signal appears at the output terminal 43 of flow amplifier 10, it is applied to the base of transistor 112 through resistors 115 and 116. This shuts off transistor 112 and transistor 108 in turn thereby providing a discharge path from capacitor 103 to terminal 6 through diode 110, resistor 111 and resistor 109. Capacitor 117 is provided to reduce or eliminate noise signals.

When the signal returns to 0 again, transistor 112 and 108 will turn on, the collector of transistor 108 will be positive and trigger NPN-transistor 118 through capacitor 119 and resistor 120. Resistor 121 connects unijunction transistor 97 and transistor 118. The clock signal thus established is amplified and fed to clock output terminals 90, 91 by a circuit including resistor 122, resistor 123, NPN-transistor 124, capacitor 125, resistor 126, diode 127, resistor 128, resistor 129 and NPN-transistor 130.

Figure 5:
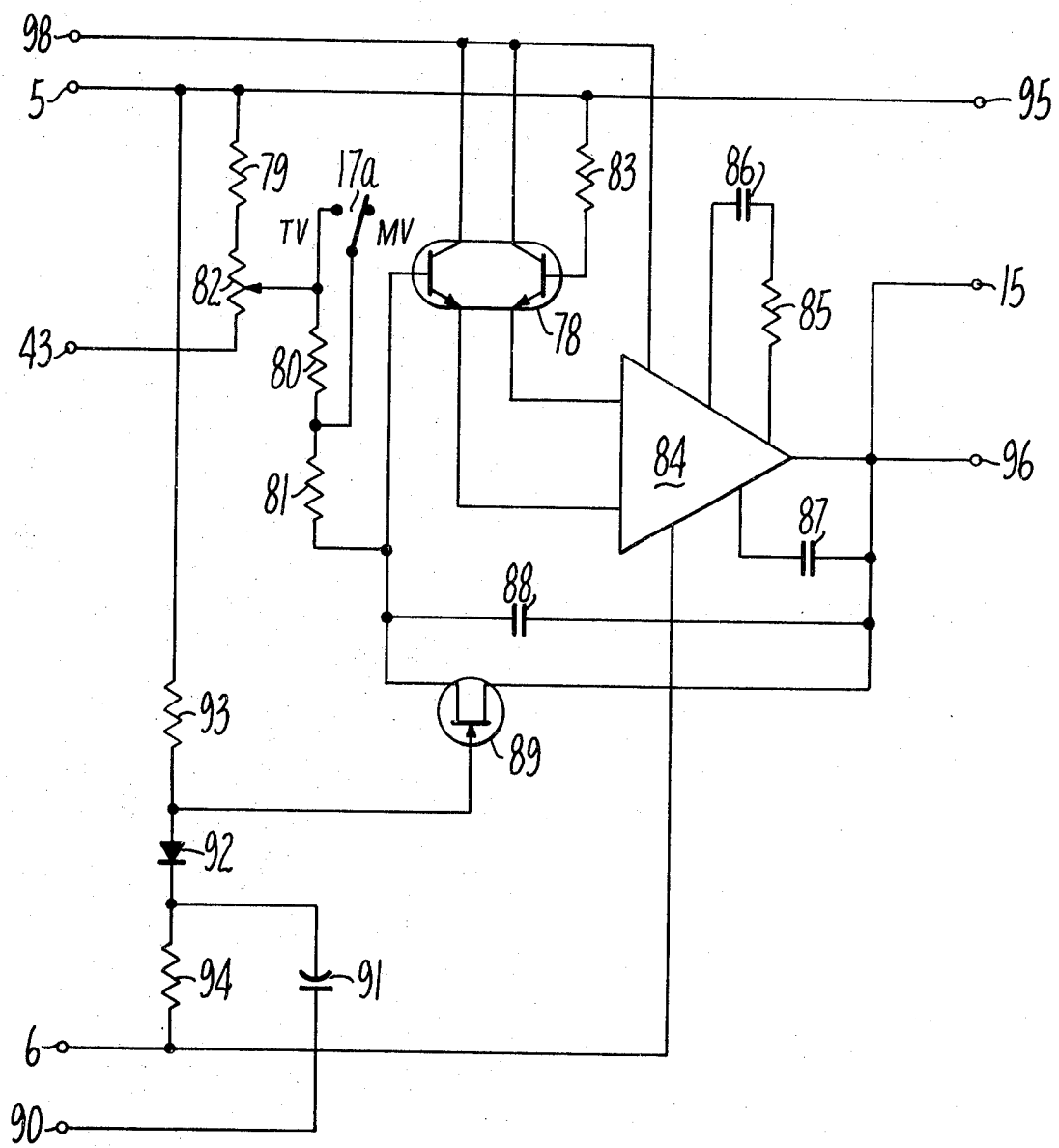
FIG. 5 is a detailed schematic of the integrating amplifier shown in FIG. 1.

The trailing edge of the pulse signal appearing at the collector of transistor 124 triggers transistor 130 and applies a pulse through terminal 90, capacitor 91 and diode 92 to the gate of transistor 89 to discharge periodically integrating capacitor 88 (see FIG. 5).

THE METER AMPLIFIER

Figure 7:
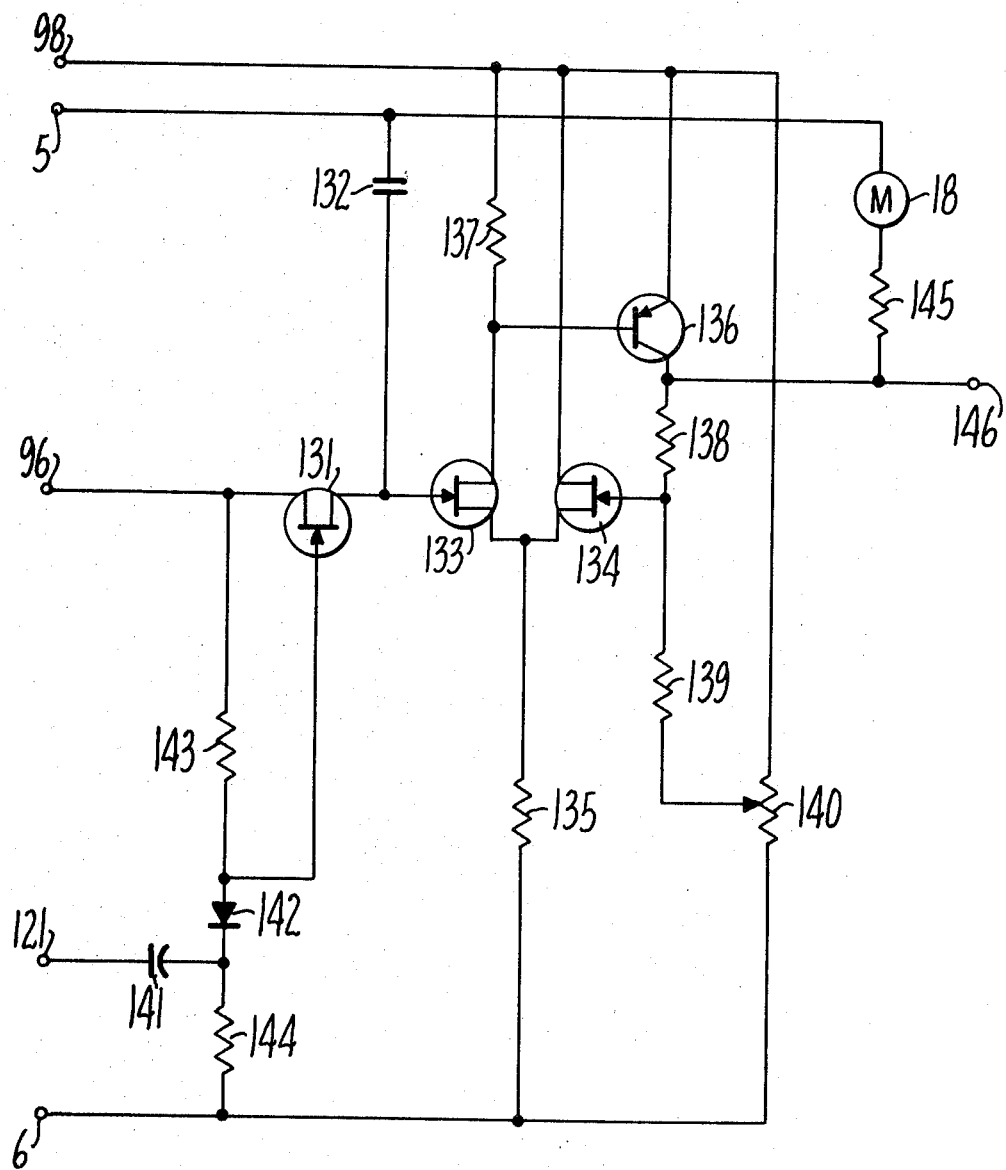
FIG. 7 is a detailed schematic of the meter amplifier and the meter shown in FIG. 1.

The voltage output from operational amplifier 84 is periodically applied to the meter amplifier 16 to provide a reading of meter 18 reflecting either tidal volume or minute volume depending upon the mode of operation. The output voltage from operational amplifier 84 is applied to a gate established by field effect transistor 131 (FIG. 7). When transistor 131 is triggered, capacitor 132 is charged to the voltage which has been integrated in capacitor 88 (see FIG. 5). This voltage is applied to the gate of field effect transistor 133, (see FIG. 7) which is source coupled to field effect transistor 134 through common source resistor 135. The drain of transistor 133 is fed to PNP-transistor 136 and is amplified to supply a voltage output signal to meter 18 through resistor 145. Fixed resistors 137, 138, 139 complete the circuit. Potentiometer 140 operates to control the zero balance of transistors 133 and 134 and acts as a meter null adjustment.

The gate of transistor 131 is periodically triggered by the pulse signal appearing at the collector of transistor 124 in the clock (see FIG. 6). This signal is coupled to the gate of transistor 131 by a circuit including terminal 121, coupling capacitor 141, and diode 142. Resistors 143 and 144 complete the circuit.

From the foregoing it will become apparent that when mode switches 17a and 17b are in the minute position, the condenser 132 will become charged at each timed clock pulse and provide the meter 18, connected through resistor 145 to output terminal 146 with a voltage reading proportional to flow rate, whereas when mode switches 17a and 17b are in the tidal position, the volume signal will read out when exhaled flow reaches zero and provide a voltage proportional to the volume of each breath.

ALARM AMPLIFIER AND GATE amplifier and gate

Figure 8:
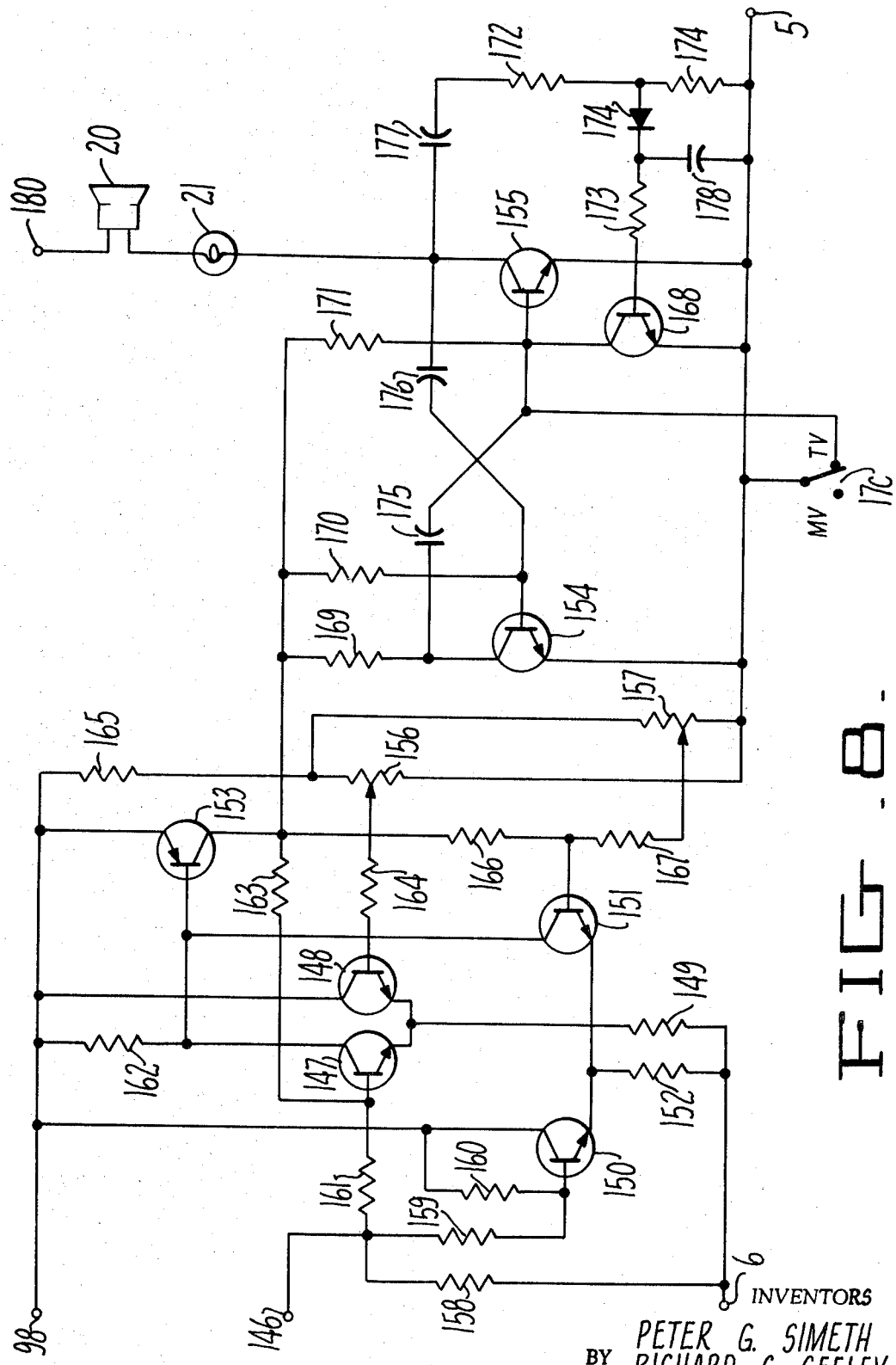
FIG. 8 is a detailed schematic of the alarm amplifier and gate shown in FIG. 1.

The voltage signal appearing at the collector of transistor 136 (FIG. 7) is applied through terminal 146 (FIGS. 7 and 8) to the base of an NPN-transistor 147 which is emitter coupled to an NPN-transistor 148 by means of resistor 149 as well as to the base of an NPN-transistor 150 which is emitter coupled to an NPN-transistor 151 through resistor 152. The collector of transistor 147 and the collector of transistor 151 are fed to the base of PNP-transistor 153 which acts as a gate to activate a multivibrator made up of NPN-transistors 154, 155. In the gating circuit, transistors 147 and 148 act to trigger gate 153 whenever the flow volume is too high and transistors 150 and 151 act to trigger gate 153 when the flow volume is too low. Potentiometers 156 and 157 provide the adjustments for selecting the proper operating point for the high- and low-volume signals respectively. Resistors 158, 159, 160, 161, 162, 163, 164, 165, 166 and 167 complete the gating circuit. When the gate 153 is on, power is supplied through gate 153 to the multivibrator 154, 155. If the mode operation switch 17c is in the closed position (shown in FIG. 8), the tidal volume position, the multivibrator will be inoperative. If on the other hand switch 17c is in the open position, the multivibrator will be activated causing horn 20 and lamp 21 to pulse at the free running frequency of the multivibrator. NPN-transistor 168, resistors 169, 170, 171, 172, 173 and 174, capacitors 175, 176, 177 and 178, diode 179 and power terminal 180 complete the circuit of the alarm amplifier and gate.

THE POWER SUPPLY

Figure 9:
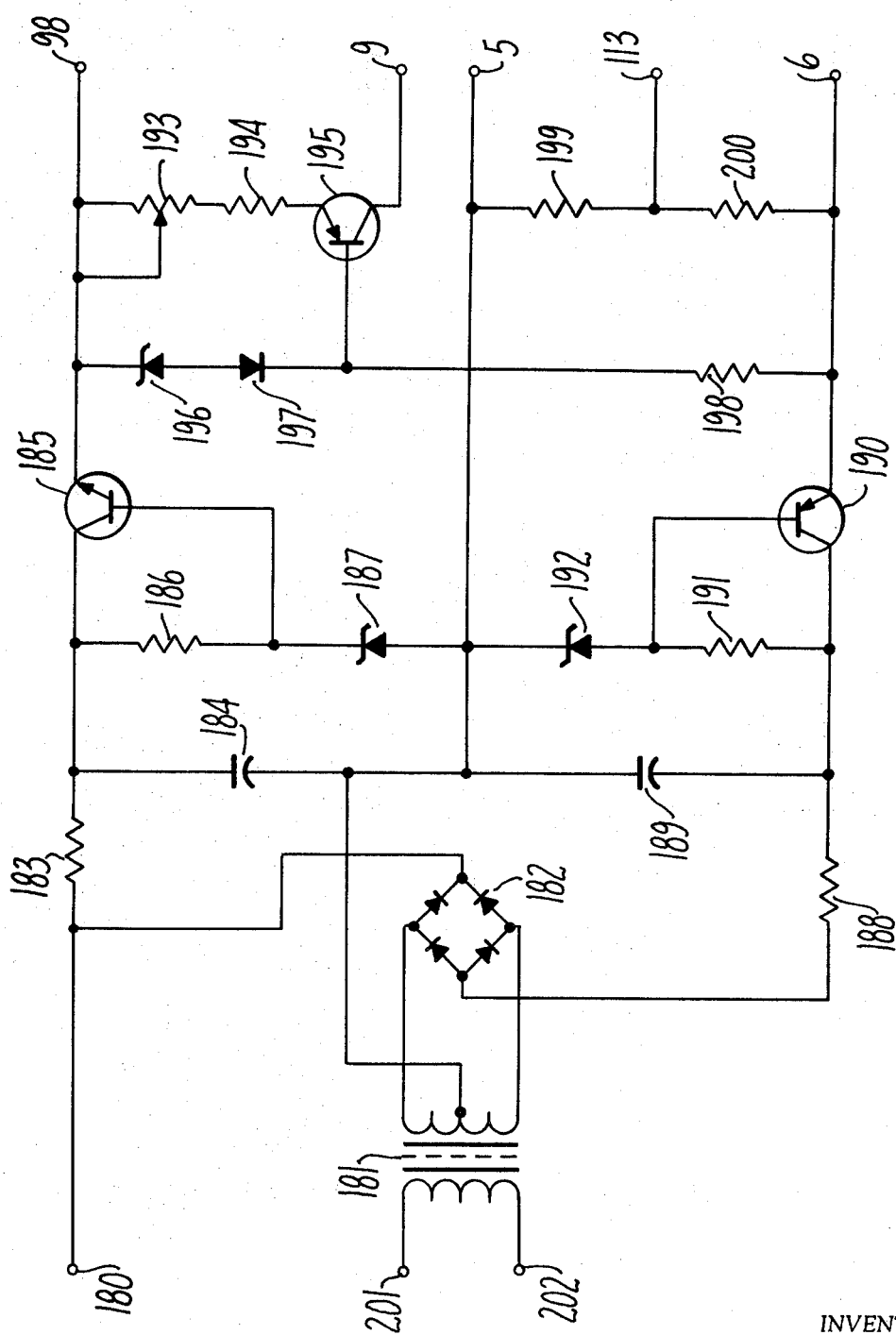
FIG. 9 is a detailed schematic of the power supply shown in FIG. 1.

The power supply for the entire system (see FIG. 9) has been designed for use with a line voltage of 115 volts, 60 cycles. The power transformer 181 has a center tapped output of 24 volts which is fed to a bridge rectifier 182. A positive potential of approximately 10 volts is supplied to terminal 98 through a filtering network comprising resistor 183 and capacitor 184 and a voltage regulating circuit comprising NPN-transistor 185, resistor 186 and zener diode 187.

A negative potential of approximately 10 volts is provided through a filtering network comprising resistor 188 and capacitor 189 and a voltage regulating circuit comprising PNP-transistor 190, resistor 191 and zener diode 192. A source of constant current is provided to terminal 9 through a variable resistor 193, a fixed resistor 194, and a PNP-transistor 195, the latter being controlled by a circuit including zener diode 196, diode 197 and resistor 198. Resistors 199 and 200 make up a voltage divider establishing a source 113 for the emitter of transistor 112 of the clock (see FIG. 6). Terminals 201, 202 are connected to the power source.

THE VALUES OF COMPONENTS

It will be understood, of course, that the foregoing specification represents the best mode contemplated by the applicants for carrying out their invention. In order to avoid any necessity for experimentation in putting the invention to practical use, the values of the various components are hereinafter set forth with particularity, but not by way of limitation.

Thermistor 2 is a 0.030 Dia Glas Probe and has a resistance at 20° C. of 8,000 ohms, has a resistance ratio 0° C./50° C. of 7.27±10 percent a dissipation constant (MW/° C.) of 0.3 and a time constant of 2.6 seconds. Thermistor 8 is a 0.06 Dia Glas Probe and has a resistance at 20° C. of 10,000 ohms, has a resistance ratio 0° C./50° C. of 7.27±10 percent a dissipation constant (MW/°C. of 0.7 and a time constant of 16 seconds. In the preferred embodiment, the applicants have used thermistors manufactured by Fenwall Electronic Company under its type Nos. K1170 and GB-41m2 respectively. The operational amplifiers 10, 84 are both type 709C.

SEMI CONDUCTORS

| Part Number | RME type number |
| --- | --- |
| 39, 190 | 2N5040 |
| 61-64, 92, 107, 110, 127, 142, 179, 182, 197 | 1N482B |
| 65, 196 | 1N5231B |
| 70, 112, 118, 124, 130, 147, 148, 168, 150, 151, 154 | 2N3565 |
| 78 | TD 101 |
| 89, 131 | 2N5163 |
| 97 | 2N4852 |
| 67, 68, 108, 136, 153, 195 | 2N4248 |
| 133, 134 (matched) | 2N5163 |
| 185, 155 | 2N5135 |
| 187, 192 | 1N5341A |

CAPACITORS

| Part Numbers | Values |
| --- | --- |
| 35 | 0.001 µF. |
| 46, 87 | 220 pf. |
| 47, 86 | 0.0047 µF. |
| 75 | 2.2 µF. |
| 76 | 0.01 µF. |
| 88 | 5 µF. |
| 91, 117, 177, 178 | 15uF. |
| 103 | 33 µF. |
| 119, 125, 141 | 1 uF. |
| 132 | 0.1 µF. low leakage |
| 175 | 47 µF. |
| 176 | 0.1 µF. |
| 184, 189 | 400 µF. |

RESISTORS AND POTENTIOMETERS

| Part Numbers | Value in Ohms |
| --- | --- |
| 32 | 40.2 (1%) |
| 33 | 2K (1%) |
| 34 | 10K (1%) |
| 36 | 75 (1%) |
| 37 | about 100 (1%) |
| 38, 99 | 1.2K |
| 40 | 7.5K |
| 41 | about 270 |
| 42 | 3.48K (1%) |
| 44, 114 | 2.2M |
| 45, 85, 165, 198 | 1.5K |
| 48 | 15K |
| 50 | 390 |
| 51 | 330 |
| 52, 100 | 270 |
| 53 | 220 |
| 54 | 3.3K |
| 55 | 560 |
| 56 | 9.1K |
| 57 | 8.2K |
| 58 | 6.8K |
| 59 | 1.5K |
| 60, 82, 193 | 1K potentiometer |
| 66, 69, 105, 111, 126, 128, 137, 149, 152, 162 | 47K |
| 72 | 150K |
| 73, 135, 138 | 100K |
| 74 | 33K |
| 79 | 5.1K |
| 80 | 1.3M (1%) |
| 81 | 200K (1%) |
| 83 | 1M |
| 93, 139, 143, 163, 166 | 470K |
| 94, 106, 144, 160 | 250K |
| 101 | 820K |
| 102 | 10K |
| 104, 109, 115, 116, 129, 140, 158, 159, 161, 164, 167, 170, 194 | |
| 120, 200 | 6.2K |
| 122 | 33K |
| 123 | 2.2K |
| 145 | 6.65K (1%) |
| 156, 157 | 5K wirewound potentiometer |
| 169, 171, 172, 173, 174 | 3.3K |
| 183, 188 | 22 |
| 186, 191, 199 | 470 |

It will be understood that the foregoing specification is intended to describe only the preferred embodiment of the applicants' invention. Numerous modifications will become apparent to those skilled in the art upon reading and understanding of the foregoing specification. With that understanding, the invention is defined and claimed in the following claims.

What is claimed is:

1. A flow-meter for measuring the flow rate of gases and other fluid masses comprising: a sensing bridge; a heated thermistor; means for mounting said thermistor in the path of a moving fluid mass and connecting said heated thermistor into one leg of said sensing bridge; a branch circuit connected to the input of said sensing bridge and varying the bias to said bridge; a second thermistor to correct for temperature variations in the fluid mass; means for mounting said second thermistor in the path of the moving fluid mass and connecting said second thermistor into said branch circuit; means including an electrical power supply connected to said sensing bridge and a variable resistance for altering the power supplied to said sensing bridge and maintaining said heated thermistor at a substantially constant temperature; a constant current source connected to said branch circuit; a differential amplifier connected to said sensing bridge; a feedback amplifier connected to the output of said differential amplifier, and electrical means responsive to the signal of said feedback amplifier for changing the resistance in said means for maintaining the thermistor at a substantially constant temperature which linearizes the voltage output of the differential amplifier and provides a signal which is linearly proportional to flow rate.

2. The flow-meter of claim 1, and further comprising an integrating amplifier connected to the linearized output signal of said differential amplifier, means for recording the integrated volume flow of a patient's breath on a tidal basis, and means for displaying the total volume of air expelled by each breath of the patient.

* * * * *